United States Patent [19]

Lovgren et al.

[11] 4,202,020
[45] May 6, 1980

[54] MAGNETIC HEAD LOAD CONTROL SYSTEM

[75] Inventors: Jeffrey L. Lovgren; William P. Quinlan, both of Rochester, Minn.

[73] Assignee: International Business Machines Corporation, Armonk, N.Y.

[21] Appl. No.: 938,727

[22] Filed: Aug. 31, 1978

[51] Int. Cl.² ............................................. G11B 21/12
[52] U.S. Cl. ................................................... 360/75
[58] Field of Search .................. 360/75, 105, 98, 99, 360/78

[56] References Cited

U.S. PATENT DOCUMENTS

| | | | |
|---|---|---|---|
| 3,333,065 | 7/1967 | Torok | 360/105 |
| 3,491,350 | 1/1970 | Linsley | 360/103 |
| 3,641,527 | 2/1972 | Gyl | 360/105 |
| 3,751,603 | 8/1973 | Prieur et al. | 360/105 |
| 4,030,132 | 6/1977 | Ifikar et al. | 360/105 |

*Primary Examiner*—Robert S. Tupper
*Attorney, Agent, or Firm*—Keith T. Bleuer

[57] ABSTRACT

A control system for applying a magnetic head onto a magnetic disk in random places thereon including a free running oscillator and switching means responsive to pulses from said oscillator and a head load command signal derived from the disk during a revolution thereof for initiating the energization of a head engaging solenoid. The system includes a capacitor which is charged at various rates to produce an initial fast rising current in the solenoid for moving the head into close proximity with the disk, a slowly rising subsequent current in the solenoid for engaging the head with the disk gradually, and a final fast rising current in the solenoid for completing the engagement of the head on the disk.

16 Claims, 4 Drawing Figures

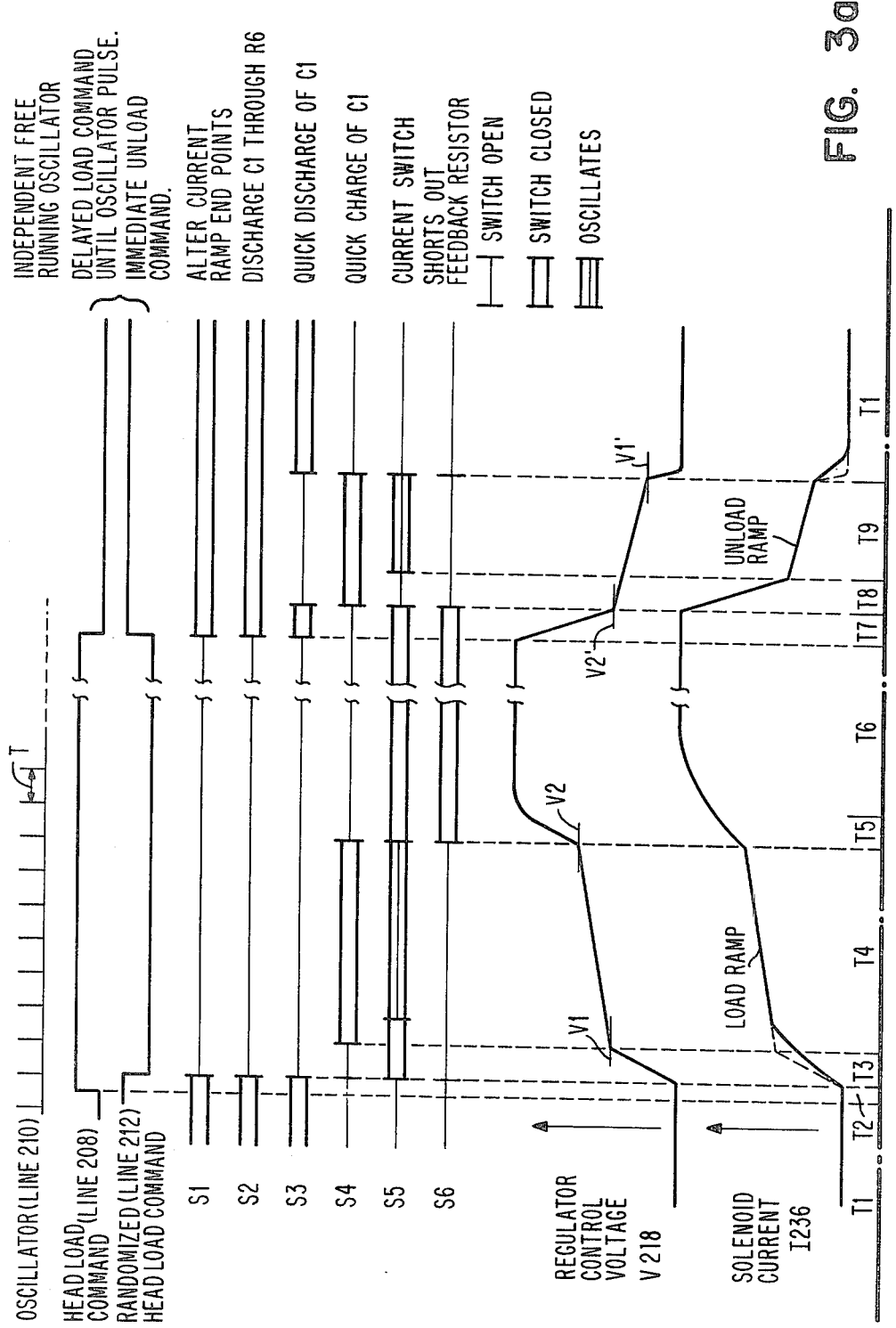

MAGNETIC HEAD LOAD CONTROL SYSTEM

BACKGROUND OF THE INVENTION

The invention relates to magnetic disks and more particularly to controllers for regulating the application of magnetic heads to the disks.

In a typical previous disk drive machine, the magnetic head is held off of the disk by a spring. An electric solenoid is energized, when desired, to overcome the spring force and to bring the head into contact with the disk. If the disk is of the type encased in a protective jacket, such as is disclosed in U.S. Pat. No. 3,668,658, the machine also may include a pressure member which is actuated by the solenoid to clamp the disk-jacket assembly to hold it in a correct predetermined plane for reliable data transfer. When the system is correctly electrically rated to handle tolerances of the head-solenoid connections and this additional task of compression of the disk-jacket assembly, the solenoid rapidly accelerates the head toward the disk. It has been noted experimentally that the rate of magnetic oxide erosion on the surface of the disk contacted by the magnetic head is very sensitive to and increases with the head impact velocity.

In many such systems, the head is loaded onto the disk at the same place, time after time. This loading, for the most part, is not done intentionally but occurs due to other requirements on the system. This may be under the control of a so-called index pulse which occurs at a particular rotative position of the disk, or such application of a head to a particular place on a disk may also be in response to other information derived from the disk during its rotation. This particular place of head application thus shortly becomes unduly worn.

SUMMARY OF THE INVENTION

It is an object of the invention to provide an improved load control system for a magnetic head being applied onto a magnetic disk which will cause the head to make contact with the disk at random places circumferentially on the disk. In this connection, it is an object to provide such an improved control system which includes a free running oscillator providing output pulses effective to delay initiation of movement of the head to the disk, if a previous head load command signal is derived from a particular rotative position of the disk.

It is also an object of the invention to provide an improved load control system for applying a magnetic head to a magnetic disk which first rapidly takes out the mechanical slack in the head applying system, which then in a subsequent operation moves the magnetic head very slowly into contact with the disk and which thereafter quite rapidly increases the head pressure on the disk.

In a preferred form, the head load control system of the invention includes an electric solenoid which causes movement of the magnetic head into contact with the disk in accordance with energization of the solenoid. The system includes a switch which is closed at the time of confluence of a free running oscillator output pulse and a head load command signal, which is continuous once when raised, for initiating a rapid energization phase of the solenoid. The solenoid in this phase takes the slack out of the mechanical connections between it and the head and may move the head into very close proximity with the disk. The system also includes a capacitor the charge of which is begun from a source of voltage at the confluence of the oscillator pulse and head load command signal, and the charge on the capacitor controls subsequent applications of voltage to the solenoid for causing similar variations in solenoid current.

The system also includes switching means in connection with the capacitor for reducing the charging rate of the capacitor in a subsequent phase of operation and for causing a corresponding reduced rate of current increase in the solenoid, and in this phase the solenoid causes the magnetic head to actually impact the disk, with the impact being very gradual for thereby minimizing head and disk wear.

The capacitor on further charging during a later phase causes other switching means in the system to be closed for providing a subsequent abrupt final charging of the capacitor, and the solenoid current increases abruptly during this phase correspondingly to cause the head to fully engage the disk.

Since the confluence of the head load command signal and output pulse of a free running oscillator is used for initiating head engagement, the final head engagement occurs at different points on the disk, assuming that data of one form or another is derived from the disk for raising the load head command signal.

BRIEF DESCRIPTION OF THE DRAWINGS

FIGS. 3a and 3b, when FIG. 3a is placed above FIG. 3b, constitute a timing diagram showing the output of the oscillator, the closing and opening movements of the switches, head load command signals, the current through the solenoid, a Regulator Control Voltage which is that voltage across the capacitor, and various other voltages in the circuitry of the system.

DESCRIPTION OF THE PREFERRED EMBODIMENT

Figure 1:
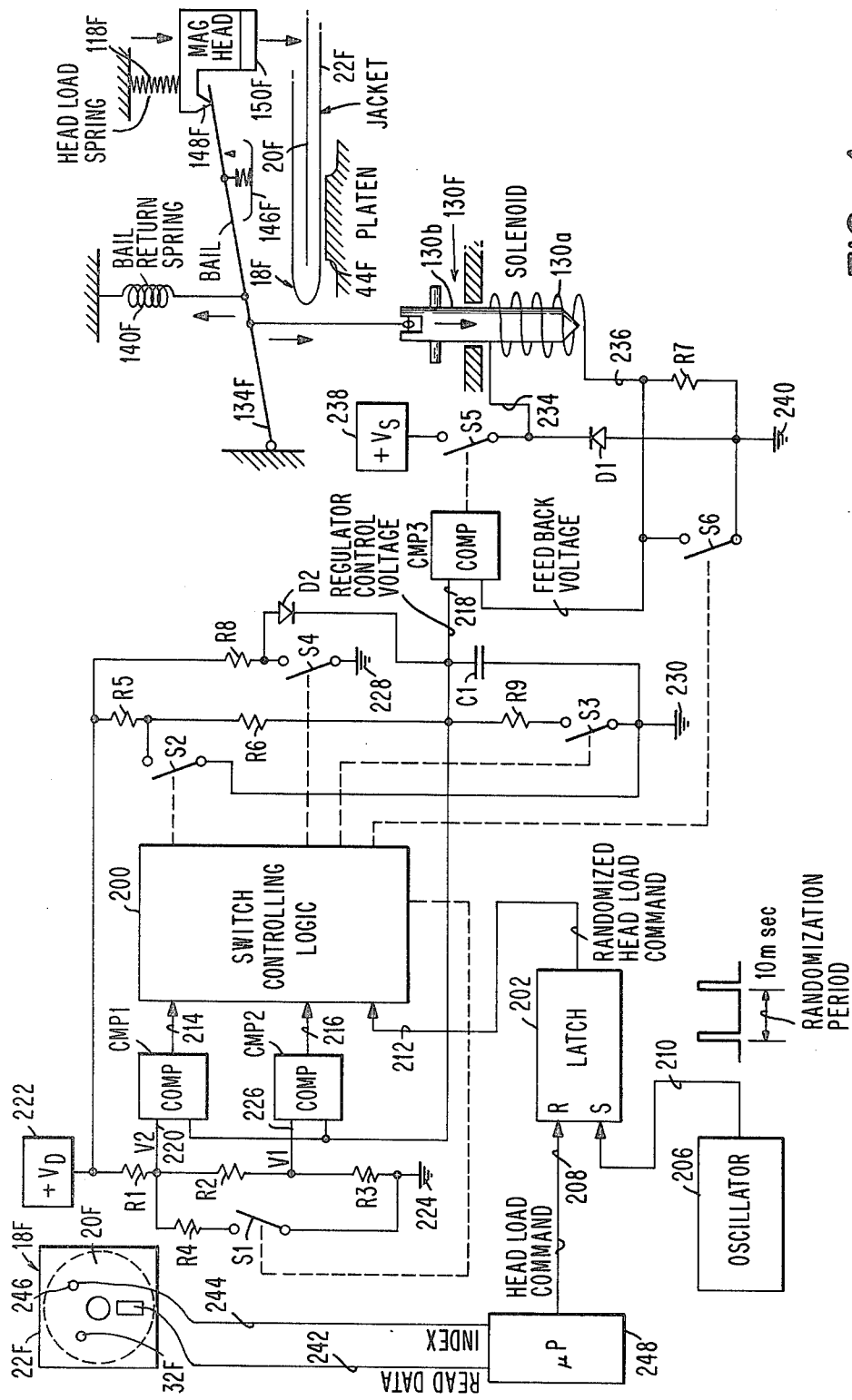
FIG. 1 is a schematic illustration of the magnetic head load control system or controller of the invention and including an electric solenoid mechanically connected to control application of a magnetic head to a magnetic disk, a capacitor the charge on which controls the current through the solenoid and thus the movement of the magnetic head toward and into pressure contact with the magnetic disk, a plurality of switches particularly for controlling the charging and discharging rates of the capacitor, a free running oscillator an output pulse of which is partially effective for initiating energization of the solenoid and a switch controlling logic block.

The head load control system or controller of the invention is adapted to be used for controlling the disk drive machine shown in U.S. Pat. No. 4,089,029, issued May 9, 1978; and certain parts of the machine shown in FIG. 1 hereof have been accorded the same reference characters as are used for corresponding parts in said patent but with the addition of the suffix (F). The head load control system and disk drive machine are adapted to be used in connection with a disk assembly 18F (see FIG. 1) which is shown in two places in FIG. 1 for ease of illustration of the circuitry. The assembly 18F includes a magnetic disk 20F rotatably disposed in a jacket 22F. The disk 20F has an index hole 32F in it adapted to cooperate with appropriate photoelectric apparatus to produce an index or timing pulse once for each revolution of the disk 20F. The disk assembly 18F is disposed between a platen 44F and a pressure member 146F, and the pressure member 146F is actuated by a swingable lever or bail 134F which is moved by an electromagnet 130F against the action of a return spring 140F. The electromagnet 130F is shown schematically in FIG. 1 hereof as including the winding 130a which encircles a movable armature or plunger 130b.

An electromagnetic head or transducer 150F is moveable from above a single selected track on the disk 20F toward the disk 20F and track in order to have a data transferring relationship with respect to the disk. A spring 118F is effective to move the transducer 150F toward the disk 20F, and the transducer 150F is provided with a hook 148F which overlies the end of lever 134F so that, when the lever 134F is swung in the clockwise direction as seen in FIG. 1 hereof, the spring 118F is effective to move the transducer 150F into contact with the disk 20F. Although only the single transducer 150F is illustrated in FIG. 1 hereof, it is apparent that another opposite transducer effective on the other side of the disk 20 may be provided, if desired, in accordance with the teachings of said U.S. Pat. No. 4,089,029.

As shown in FIG. 1, the head load control system comprises resistors R1, R2, R3, R4, R5, R6, R7, R8 and R9, switches S1, S2, S3, S4, S5 and S6, diodes D1 and D2, capacitor C1, comparators CMP1, CMP2 and CMP3, switch controlling logic 200, latch 202 and oscillator 206.

Figure 2:
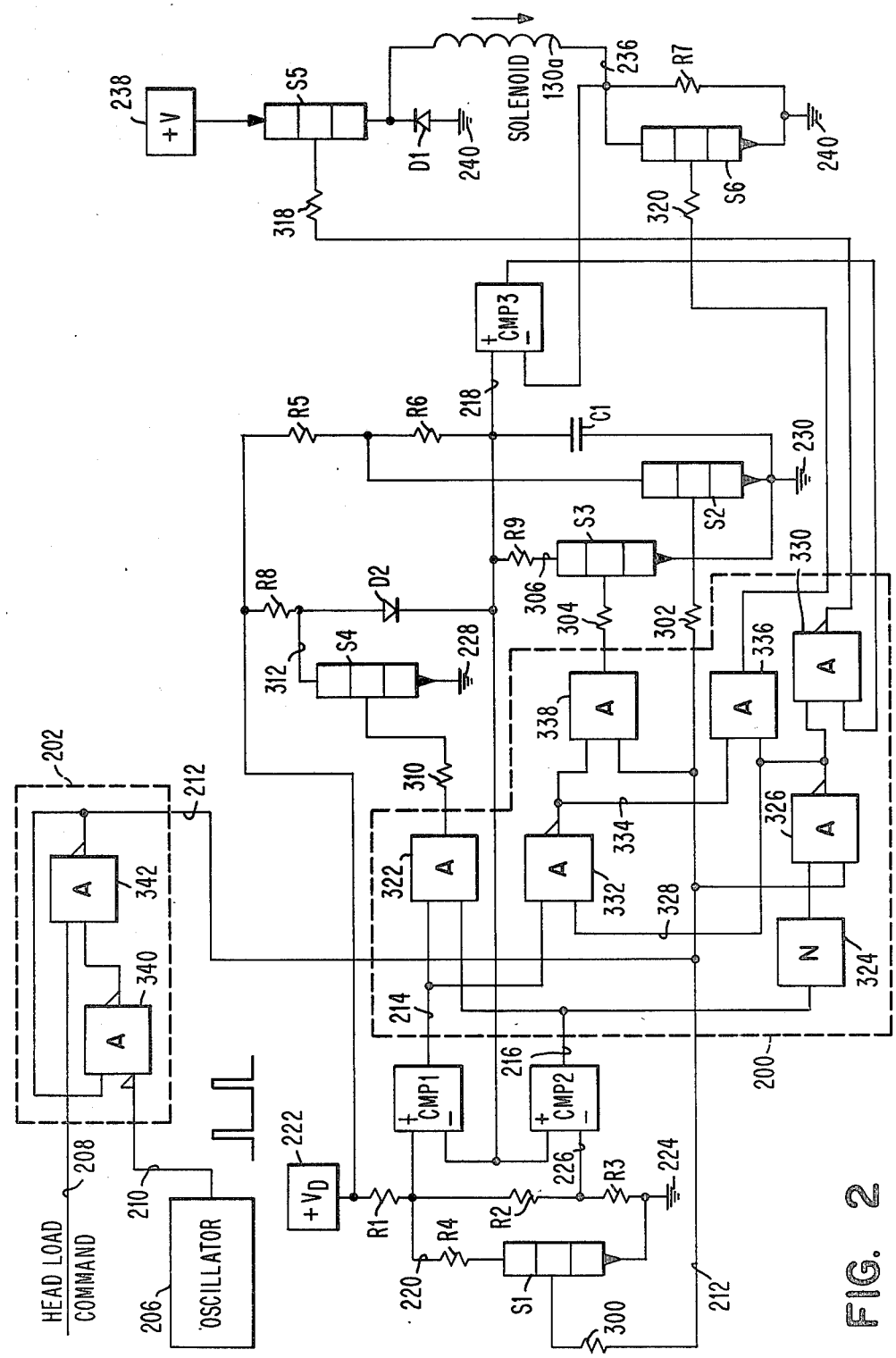
FIG. 2 is a schematic illustration of the switch controlling logic in more detail than in FIG. 1 and other components of the system that are connected to certain components of the switch controlling logic.

The switch controlling logic 200 is shown in FIG. 1 as having dotted line connections with switches S1-S6. These switches may if desired actually be switching transistors, and details of logic 200 for controlling such transistors is shown in FIG. 2 and will be subsequently described in detail.

Referring to FIG. 1, operation of the head load controller is initiated by a Head Load Command signal on line 208 which is applied to the reset terminal of latch 202. Oscillator 206 is a free running oscillator and provides a pulsed output on line 210 which is connected to the set terminal of latch 202. The output of latch 202 is a Randomized Head Load Command signal on line 212, and this constitutes an input to switch controlling logic 200. The outputs of comparator CMP1 and CMP2 respectively on lines 214 and 216 also constitute inputs to the switch controlling logic 200. A Regulator Control Voltage is provided especially by capacitor C1 on line 218, and this line constitutes an input to each of comparators CMP1 and CMP2. In addition, comparator CMP1 has the line 220 as an input and resistors R1, R2 and R4 all are connected to line 220 in the manner shown. Resistor R1 is also connected to a $V_D$ voltage supply 222.

Resistors R2 and R3 are connected in series to ground 224, and line 226 joining resistors R2 and R3 is connected to comparator CMP2 as an input. Switch S1 and resistor R4 are connected between ground 224 and line 220 and therefore also in parallel with resistors R2 and R3.

Resistors R5 and R6 are connected between voltage source 222 and Regulator Control Voltage line 218. Resistor R8 and diode D2 are connected in series between voltage source 222 and line 218, and switch S4 is connected between the diode D2 and resistor R8 junction and the ground 228. Switch S2 is connected between ground 230 and the junction between resistors R5 and R6. Switch S3 connects line 218 and ground 230 through resistor R9, and capacitor C1 is connected between line 218 and ground 230.

Winding 130a has supply leads 234 and 236, and lead 236 constitutes an input to comparator CMP3 along with the Regulator Control Voltage line 218. Comparator CMP3 controls switch S5, and switch S5 connects a voltage source 238 with lead 234. Diode D1 connects lead 234 with ground 240, and resistor R7 and switch S6 connect lead 236 with ground 240.

The head load controller is under the control of information derived from the disk 20F during its rotation. When the disk assembly 18F is used in the disk drive machine above referred to, it provides read data on a line 242 and a series of index pulses (one for each 360° of rotation of disk 20F) on line 244. The index pulses on line 244 may be derived from the index hole 32F in the disk 20F and a photoelectric detector 246 that is responsive to light passing through hole 32F as disk 20F rotates. The read data on line 242 may also occur cyclically with rotation of disk 20F. Lines 242 and 244 constitute inputs to a microprocessor 248 which provides the Head Load Command signal on line 208.

Figure 3B:
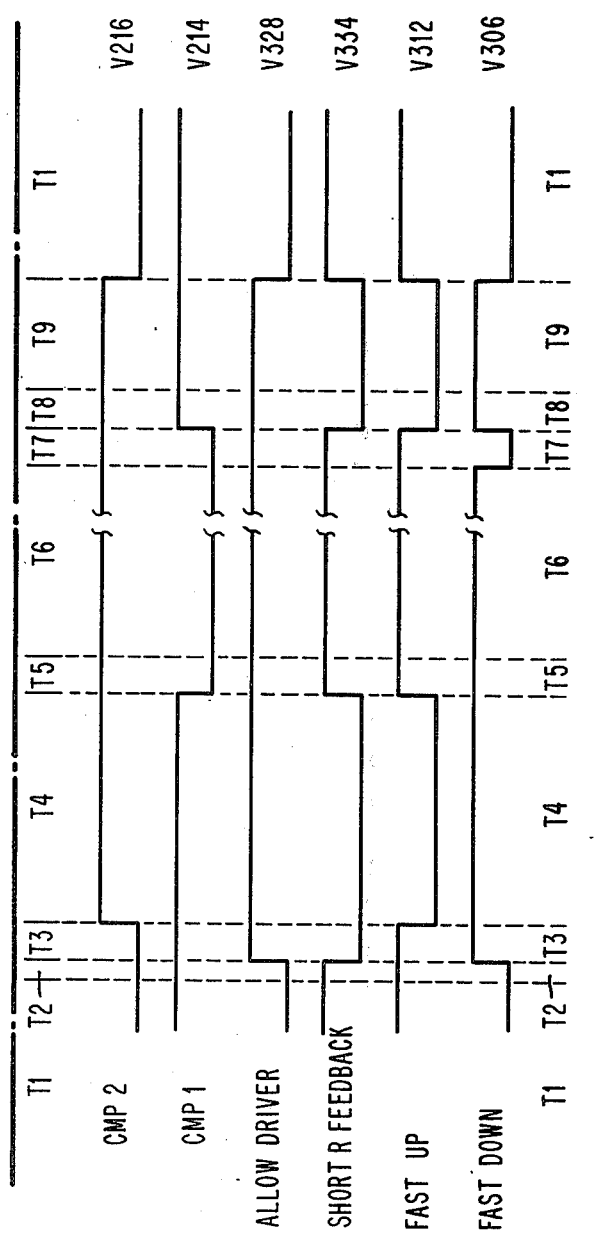

The timing diagram of FIGS. 3a and 3b illustrates various voltages and currents and the conditions of the various switches at various times during the operation of the head load controller of FIG. 1. The operation, including the loading of the head 150F and its unloading, occurs during various time periods, particularly time periods T1, T2, T3, T4, T5, T6, T7, T8 and T9. Time period T1 is that time period prior to the raising of the Head Load Command signal on line 208; and, during this time period, the oscillator 206 provides oscillator pulses on line 210 that is connected to the set terminal of latch 202. These oscillator pulses are at a time T apart which may be termed the randomization period. During time period T1, as shown in FIG. 3a, the Regulator Control Voltage (V218) on line 218 is 0, and this causes no solenoid current (I236) in line 236. As a result of no solenoid current in line 236, the bail return spring 140F acting through the lever 134F holds the magnetic head 150F off of the disk 20F. Switches S1, S2 and S3 are closed; while the other switches S4, S5 and S6 are open. A double line shown in FIGS. 3a and 3b in connection with any of these switches indicates that the particular switch is closed, while a single line in connection with any switch indicates that the switch is open. A triple line, as in connection with switch S5, indicates that the switch for the period of time indicated by the triple line oscillates or alternately opens and closes.

Initiation of operation of the head load controller, eventually causing an engagement of magnetic head 150F with the disk 20F, is caused by the Head Load Command signal on line 208 going high. This begins time period T2 as shown in FIGS. 3a and 3b, and a random delay of up to T (T being the period of oscillator 206) then occurs before the Head Load Command signal resets latch 202 to drop the Randomized Head Load Command signal on line 212 to trigger the rest of the controller. As shown in FIG. 3a, when the Randomized Head Load Command on line 212 goes low, the time period T3 begins. At this time, switches S1-S3 open; switches S4 and S6 remain open; and switch S5 closes. Opening of switch S3 removes ground from resistor R9 and applies the voltage from voltage source 222 to Regulator Control Voltage line 218 to allow charging of capacitor C1 through diode D2 and resistor R8. The voltage on line 218 applied to the comparator CMP3 causes the comparator to close switch S5, and the voltage from source 238 is thereby applied to solenoid winding 130a which is then effectively connected in series with resistor R7. As capacitor C1 charges, the Regulator Control Voltage V218 increases abruptly on a straight line basis as shown in FIGS. 3a and 3b (during time period T3), and the solenoid current in winding 130a rises also but not as fast as the voltage on line 218 as shown in FIG. 3a. Switch S3, being in parallel with capacitor C1 through resistor R9, is open at this time to allow the charging of capacitor C1. Switch S1 is open at this time, during time period T3, so that the voltage on line 218 rises directly during this time to its value V1 determined by comparator CMP2 (further details of this operation will be subsequently given). The rise of the solenoid current I236 during time period T3, somewhat slower than the Regulator Control Voltage rise on line 218 during this time period due to the inductance of winding 130a, causes the solenoid 130F to apply a force on lever 134F and against spring 140F so that the magnetic head 150F moves toward disk 20F.

When the rapidly rising Regulator Control Voltage on line 218 and applied on capacitor C1 reaches the value of V1 (at the end of time period T3), the logic 200 closes switch S4 to ground the junction of resistor R8 and diode D2. This causes capacitor C1 to slowly charge through resistors R5 and R6 during the subsequent time period T4. The Regulator Control Voltage V218 thus during this time period T4 increases relatively slowly from value V1 to value V2 as shown in FIG. 3a. The voltage V2 is determined by comparator CMP1 as will be subsequently described in detail. The current I236 through solenoid winding 130a, with the switch S5 closed, increases; and once the solenoid current I236 catches up to the control voltage V218 on line 218, the comparator CMP3 causes the current in solenoid winding 130a to slowly rise at the same rate as the control voltage on line 218 by rapidly switching switch S5. This rapid switching results from the feedback voltage on line 236 generated by the current in solenoid winding 130a passing through resistor R7, with the voltage across resistor R7 being applied to the comparator CMP3 as will be subsequently described in greater detail. In this manner, the current I236 through the solenoid winding 130a and in line 236 tracks the Regulator Control Voltage V218 (during time period T4).

Under this current feedback control during time period T4, the force of the solenoid armature 130b on the lever 134F is very slowly increased (in accordance with the slow increase of solenoid current I236 during this time period), thus moving the head 150F slowly into contact with the disk 20F and then slowly increasing the pressure of the head. At the end of this time period T4, when the Regulator Control Voltage on line 218 has risen to the value V2, the force from the solenoid armature 130b on the lever 134F has been increased to a point in which the magnetic head 150F is in full contact with the disk 20F.

At this time, at the end of time period T4 and at the beginning of time period T5, switch S4 opens and switch S6 closes, and switch S5 goes into the condition of full closure. The opening of switch S4 causes a rapid charging of capacitor C1 as during time period T3. This causes the Regulator Control Voltage on line 218 to increase rapidly during this time period T5. The closure of switch S6 causes resistor R7 to be shorted out so that the feedback voltage on line 236 goes to 0 volts. Comparator CMP3 thus causes a full closure of switch S5, and the voltage source 238 having a full uninterrupted connection with solenoid winding 130a causes the current in the winding 130a to rapidly increase during this time period T5 but at a less rate than the increase of voltage on line 218 due to the inductance of winding 130a.

During time period T6, the voltage on line 218 is at the maximum; and virtually all of the voltage of source 238 is applied to and is dropped across the solenoid winding 130a (resistor R7 remains shorted out), maximizing the current in solenoid winding 130a. As a result, the pulling force by the solenoid 130F on the lever 134F is maximized during this period; and the head 150F is thus applied with its maximum force on the disk 20F with no contact between lever 134F and hook 148F.

As is apparent from FIG. 1, the pressure member 146F moves along with the lever 134F and has a clamping action with respect to the disk assembly 18F corresponding to the movement of lever 134F by the solenoid 130F. Thus, the clamping action by the pressure member 146F on the disk assembly 18F increases during time periods T3-T5 and is maximized during time period T6 in accordance with the increases of solenoid current I236 during these time periods. The disk 20F is thus held clamped in its proper plane for data transfer between disk 20F and head 150F.

Unloading of the head 150F with respect to the disk 20F is initiated by lowering the Head Load Command signal on line 208 (at the beginning of time period T7). Latch 202 is thus reset, and the Randomized Head Load Command signal on line 212 goes high. The switch controlling logic 200, on this change of the Randomized Head Load Command signal on line 212, closes switches S1, S2 and S3. The closing of switch S3 connects line 218 with ground 230 through resistor R9 and thus causes a fast discharge of capacitor C1. A slow discharge of the capacitor C1 is initiated by the closure of switch S2, but this is masked by the fast discharge through switch S3. The Regulator Control Voltage on line 218 thus drops quickly in time period T7. At the end of time period T7, the Regulator Control Voltage on line 218 is at the value V2', which is less than the voltage value V2 and is provided by the comparator CMP1 as influenced by closure of switch S1 as will be later described in greater detail. Comparator CMP1 senses when the control voltage on line 218 reaches the value V2' as will be described later in greater detail thus terminating time period T7 and beginning time period T8.

At this time (at the beginning of time period T8), switches S3, S5 and S6 are opened, and switch S4 is closed. Switch S2 is then effective in connection with resistor R5 to provide a slow discharge of capacitor C1 so that the Regulator Control Voltage V218 reduces from the value V2' toward the value V1+. During time period T8, the opening of switch S5 severs the voltage source 238 with the solenoid winding 130a, and the current I236 through the winding 130a drops suddenly. The opening of switch S6 in effect puts resistor R7 in series with the solenoid winding 130a for subsequent current regulation through the winding 130a. The switch S4 is closed, so that capacitor C1 is not charged.

At the end of period T8 and at the beginning of period T9, the current I236 in the solenoid 130a has reduced to a value that corresponds with the then existing reduced voltage on the capacitor C1. At this time, the switch S5 is oscillated in condition by the comparator CMP3, so that the switch S5 functions as before in time period T4 to regulate the current flow through the solenoid winding 130a to values corresponding to the voltage across the capacitor C1. The current I236 thus gradually reduces on its "Unload Ramp" (see FIG. 3a) corresponding to the reducing voltage of the capacitor C1 until the voltage on the capacitor reaches the value V1' at the end of time period T9. The engaging force on the head 150F with respect to the disk 20F varies with the solenoid current, and thus the engaging force is gradually reduced during time period T9 for reasons to be more fully explained.

At the end of the time period T9, switch S3 is closed, and switches S4 and S5 are opened. The opening of switch S5 disconnects the voltage source 238 with the solenoid winding 130a so that the current I236 in the winding 130a rapidly reduces to zero, corresponding to a full disengagement of the head 150F with the disk 20F Diode D1, immediately after switch S5 opens, limits the negative voltage excursion of the connection of the solenoid winding 130a and switch S5 to one diode drop below ground and conducts a transient current during this time.

As has been previously described, engagement of the magnetic head 150F with the disk 20F is initiated when the Head Load Command signal on line 208 is up and when a subsequent oscillator pulse occurs on line 210. Therefore, actual initiation of the head engaging action may vary within the time period T of the oscillator 206 which may be 10 milliseconds, for example. The Head Load Command signal on line 208 may be initiated by the index pulse which appears on line 244 once for every revolution of disk 20F. Therefore, actual initiation of engagement of head 150F on disk 20F may take place any time within the time period T following the index pulse on line 244, and this corresponds with a certain partial revolution of disk 20F. Assuming, for example, that it requires 167 milliseconds for disk 20F to make a complete revolution and the time period T between oscillator pulses is 10 milliseconds, the head 150F may be engaged with the disk 20F within a 22° sector on the disk 20F.

In the event that head-disk engagement is timed with respect to certain data supplied from disk 20F on the read data line 242, the Head Load Command signal on line 208 may be raised by microprocessor 246 on the existence of this data; and, in this case, initiation of engagement of the head 150F with respect to the disk 20F will occur randomly within the time period T following the raising of the read data signal on line 242.

Referring to FIG. 2 which shows the circuitry of the load control system and particularly the logic 200 in greater detail than FIG. 1, it will be observed that each of the switches S1-S6 constitutes a switching transistor with certain electrical components connected with it for current limiting, etc. The switch S1 is a transistor having its base connected by means of a resistor 300 with the Randomized Head Load Command line 212 passing through logic 200. The switch S2 is a transistor having its base connected by means of resistor 302 with the line 212 in logic 200. The switch S3 is a transistor having its base connected to a resistor 304 and having its collector connected by means of a line 306 with resistor R9 that in turn is connected to the line 218. The switch S4 is a transistor having its base connected with the resistor 310 and having its collector connected by means of a line 312 with the junction between diode D2 and resistor R8. The switch S5 is a PNP type transistor having its base connected with a resistor 318, and the switch S6 is a transistor having its base connected with a resistor 320.

The switch controlling logic 200 includes an AND circuit 322 which has the lines 214 and 216 as its two inputs and has its output connected with the resistor 310. Logic 200 also includes an inverter 324 having its input connected with line 216 and having its output connected to an AND circuit 326. The other input of the AND circuit 326 is the line 212. The output of the AND circuit 326 is a line 328 which is applied as an input to an AND circuit 330. The AND circuit 330 also has the output of the comparator CMP3 as an input and has its output connected to the resistor 318. The line 328 is an input to an AND circuit 332, and the line 214 constitutes the other input to the AND circuit 332. The output of the AND circuit 332 is a line 334, and the lines 334 and 328 constitutes inputs to an AND circuit 336, the output of which is connected to the resistor 320. The lines 212 and 334 constitute inputs to an AND circuit 338, the output of which is connected to the resistor 304.

The latch 202 comprises a pair of AND circuits 340 and 342. The AND circuit 340 has the lines 210 and 212 as inputs, and the AND circuit 342 has the output of AND circuit 340 and the line 208 as inputs. The line 212 constitutes the output of AND circuit 342.

The operation of the controller and particularly of the controller as shown more specifically in FIG. 2 is as follows:

The Randomized Head Load Command signal on line 212 is reduced from an up level to a down level when the Head Load Command signal on line 208 is up and when an oscillator pulse on line 210 occurs (at the beginning of time period T3). At this time, the AND circuit 342 has its two inputs satisfied, both of these inputs at the time being at an up level. The Randomized Head Load Command signal on line 212 when once at its down level assures that AND circuit 340 is not satisfied so that the latch 202 remains set, subsequent to the coincidence of an oscillator pulse on line 210 and the Head Load Command signal on line 208 at the beginning of time period T3.

Switches S1, S2, S3 and S4 control the charging and discharging of capacitor C1, and the charge on capacitor C1 controls the current flow through the solenoid winding 130a at certain times, particularly by means of the switches S5 and S6. Still more particularly, the switch S4 controls a quick charge of capacitor C1; switches S2 and S3 control discharging of capacitor C1; and switch S1 changes the end points of charging and discharging of capacitor C1. Switch S5 directly controls the current flow through solenoid winding 130a, and switch S6 indirectly controls changes of magnitude of the current in solenoid winding 130a. As shown in FIG. 3a, at the beginning of time period T3, switches S1, S2 and S3 change from closed condition to open condition; and switch S5 changes from open condition to closed condition, all on the dropping of the Randomized Head Load Command signal on line 212.

Some of these switches are under the control of the comparators CMP1, CMP2 and CMP3; and each of these compartors is so constructed that it provides an up level output signal when the voltage on the plus terminal of the comparator is higher than that on the minus terminal of the comparator and provides a down output signal when the opposite is true. The switch S1 is directly under the control of the Randomized Head Load Command signal on line 212 and is opened at the beginning of time period T3 by the dropping of the signal on line 212. The switch S1 influences the functioning of the compartors CMP1 and CMP2 and particularly the voltages at which the comparators switch; and, since the switch S1 is open at this time, the comparators CMP1 and CMP2 are uninfluenced by the resistor R4 which is in series with the switch S1. The resistors R1, R2 and R3 function as a voltage divider, being located between the voltage source 222 and ground 224, and thus provide biasing voltages on the plus and minus terminals respectively of the comparators CMP1 and CMP2. This voltage divider in particular provides voltages V2 and V1 respectively on the lines 220 and 226 (with switch S1 being open) which are impressed on the comparators CMP1 and CMP2. At the beginning of time period T3, the Regulator Control Voltage (V218) on line 218 connected to comparators CMP1 and CMP2 is zero, and therefore the comparator CMP2 has a down output on its output line 216. For the same reason, the comparator CMP1 provides a high output on its output line 214 at this time (see the V216 and V214 curves in FIG. 3b).

The switch S4 in particular is responsible for an initial quick charging of the capacitor C1 that occurs during the time period T3, and the switch S4 is open for this purpose. The AND circuit 322 controlling the switch S4 has the outputs of the comparators CMP1 and CMP2 on it as inputs; and, since the comparator CMP2 has a down output, AND circuit 322 is not satisfied and switch S4 is open. Switch S4 therefore does not ground the junction between resistor R8 and diode D2, and a quick charge current flows from the voltage source 222 through resistor R8 and diode D2 to line 218 and to capacitor C1 when switch S3 allows this by being open. The resistors R5 and R6 are relatively large and are shunted by the relatively small resistor R8 and diode D2. The Regulator Control Voltage on line 218 thus rapidly increases during time period T3 as shown in FIG. 3.

Switch S2 has a parallel connection with the capacitor C1 and controls its slow discharge and must therefore be open during time period T3 at which a quick charging of capacitor C1 occurs. Switch S2 is under the direct control of the Randomized Head Load Command signal on line 212 which drops at the beginning of time period T3, and switch S2 is therefore opened at this time.

Switch S3 also has a parallel connection with the capacitor C1 for a quick discharge thereof, and switch S3 must therefore also be open during time period T3. Switch S3 is under the control of AND circuit 338 which in turn has the Randomized Head Load Command signal on line 212 as an input; and, since this signal goes down at the beginning of time period T3, AND circuit 338 is not satisfied and switch S3 is opened.

The switch S6 remains open at the beginning of time period T3, since the Short R Feedback signal (V334) on line 334 goes low at this time (see FIG. 3b). The Randomized Head Load Command signal on line 212 goes low at the beginning of time period T3, and thus AND circuit 326 having line 212 as an input is not satisfied and produces a high Allow Driver signal (V328) on line 328. The output of the comparator CMP1 is up at this time, so that AND circuit 332 is satisfied and produces a down Short R Feedback signal on line 334 connected as an input to AND circuit 336. AND circuit 336 is connected with switch S6; and, since AND circuit 336 is not satisfied at this time, switch S6 remains opened.

Switch S5 must be closed during time period T3, and switch S5 is under the control of the AND circuit 330 which has the presently high Allow Driver signal 328 on line 328 and the output of the comparator CMP3 as its two inputs. The comparator CMP3 at this time provides an up level output, since the Regulator Control Voltage signal on line 218 is increasing with the charge on the capacitor C1 and the voltage on the minus terminal of the comparator is initially at ground potential. Thus the two inputs of AND circuit 330 are both up, satisfying AND circuit 330 to provide a low output voltage and close switch S5. With the switch S5 being closed, the current I236 in solenoid winding 130a increases rapidly as shown in FIG. 3a, the rate of rise being only limited by the inductance and resistance of the winding 130a.

At the end of the time period T3, the output of the comparator CMP2 goes high, since the capacitor C1 has charged to the voltage V1 shown in FIG. 3a which is slightly higher than the voltage on the line 226 applied to the minus terminal of the comparator CMP2. This causes switch S4 to close, since the outputs of the comparators CMP1 and CMP2 on lines 214 and 216 are both high to satisfy AND circuit 322. The closing of switch S4 causes the junction between the resistor R8 and the diode D2 to go to ground potential, stopping the fast charging of capacitor C1. Diode D2 is then back biased due to the charge on capacitor C1 and has no current flowing through it. Subsequently, all of the charging current for the capacitor C1 (during the time period T4) passes through the resistors R5 and R6 to the capacitor C1. The resistors R5 and R6 are relatively high value resistors so that the charging current through capacitor C1 is quite limited. During the time period T4, the voltage V218 on the capacitor C1 thus increases from the voltage V1 to the voltage V2, this increase being at a relatively slow rate as shown in FIG. 3a compared to the rate of increase of voltage V218 during the time period T3.

During most of time period T4, switch S5 oscillates quickly between its open and closed conditions, opening being caused by the output of comparator CMP3 going to down level when the voltage drop across resistor R7 exceeds the Regulator Control Voltage V218 (switch S6 capable of shorting resistor R7 remains open). At this instant, with the output of comparator CMP3 being down, AND circuit 330 is not satisfied, so that switch S5 opens at this instant. With the momentary cessation of current through solenoid winding 130a with the opening of the switch S5, the voltage on line 236 momentarily falls; and, since there is a certain Regulator Control Voltage on line 218, the comparator CMP3 then again returns to its condition providing a high output which is applied as one of the two inputs to the AND circuit 330. With the AND circuit 330 being again satisfied, the resultant down signal applied from the AND circuit 330 onto the gate of the switch S5 causes the switch S5 to close so that the current again increases in solenoid winding 130a. The result of the successive rapid opening and closing of the switch S5 is to cause the current I236 in the solenoid winding 130a to closely follow the Regulator Control Voltage V218, with the rise in the voltage V218 causing about the same rise of the current in line 236 on its "Load Ramp" shown in FIG. 3a. This gradual rise of solenoid current I236 causes the gradual application of the head 150F to the disk 20F as previously described.

At the end of time period T4, switch S4 opens. The voltage across the capacitor C1 at the end of time period T4 is V2, and this voltage is applied from line 218 onto the minus terminal of the comparator CMP1. The voltage V2 is greater than the voltage on the line 220 applied to the comparator, and the output of comparator CMP1 goes to its down level. Thus, the AND circuit 322 is not satisfied at this time and its output is down, so that switch S4 is opened. This allows another fast charging of the capacitor C1 during time period T5, the current flowing from the voltage source 222 through resistor R8 and diode D2 as for the quick charge in time period T3, and with the relatively large resistors R5 and R6 again shunted by the resistor R8 and diode D2.

During time period T5 (and also time periods T6 and T7), switch S6 is closed so as to short out the feedback resistor R7; and the minus terminal of comparator CMP3 is thus held continuously at ground potential. Switch S6 is under the control of AND circuit 336 which in turn is controlled by the Short R Feedback signal on line 334 and the Allow Driver signal on line 328. The Allow Driver signal on line 328 is and remains high for the reasons previously mentioned. The Short R Feedback signal on line 334 is under the control of the comparator CMP1 which has its output go low at the beginning of time period T4, since the Regulator Control Voltage on line 218 exceeds the voltage V2. The AND circuit 332 has the output of the comparator CMP1 as an input, and AND circuit 332 therefore is not satisfied at this time and produces a high Short R Feedback signal on line 334. Since the signals on both of the lines 328 and 334 applied as inputs to the AND circuit 336 are high, the AND circuit 336 provides a signal to the switch S6 to close the switch S6.

The switch S5 is full closed during the time period T5, and the effect of this switch closure is to continuously apply the voltage from the voltage source 238 to the solenoid winding 130a. As just described, the switch S6 shorts out the resistor R7 so that the minus terminal of the comparator CMP3 is held continuously at ground potential. The Regulator Control Voltage on line 218 is continuously increasing, and the comparator CMP3 thus provides a steady state continuous high output which is applied as one of the two inputs to the AND circuit 330. The Allow Driver signal on line 328 is high as has been described, and the AND circuit 330 thus is satisfied. The output of the AND circuit 330 is thus down, and this causes the current switch S5 to be and remain in continuous closed condition during time period T5. The current through solenoid winding 130a thus increases as rapidly as the inductance of the winding 130a allows.

During time period T6, switches S5 and S6 remain closed; and switch S4 remains open. The charge on the capacitor C1 increases to its maximum as shown in FIG. 3a, and the solenoid current I236 also increases to its maximum. During time period T6, the magnetic head 150F is full loaded onto the disk 20F as above described. The time period T6 can go on indefinitely, as long as it is desired that the head 150F shall remain loaded on the disk 20F.

An unloading of the head 150F with respect to the disk 20F is initiated by returning the Head Load Command signal on line 208 to its down level (at the beginning of time period T7). This has the effect of raising the Randomized Head Load Command signal on line 212 to its up level due to the functioning of the latch 202. At this time, the switches S1, S2 and S3 close, while switch S4 remains open and switches S5 and S6 remain closed. The switches S1 and S2 are connected with the line 212 so as to be under the direct control of the Randomized Head Load Command signal so that the switches close at this time. The line 212 is also connected with the AND circuit 338 and thus provides a raised signal on this AND circuit. The other input to the AND circuit 338 is the Short R Feedback line 334; and the signal on this line remains high, since the AND circuit 332 providing this signal is under the influence of the comparators CMP1 and CMP2 which do not change state at this time. The AND circuit 338 is therefore satisfied so as to close switch S3. The switch S3 is the quick discharge switch, and the capacitor C1 thus discharges from its highest voltage value to the voltage V2' at the end of the time period T7. It will be noted that the switch S4, which is for the purpose of providing a quick charge on the capacitor C1, remains in its open condition which is that condition causing the charging. For this reason, the resistance of the resistor R9 is considerably less than the resistance of the resistor R8; and the discharging action of the switch S3 controls over the effect of the switch S4.

The switches S5 and S6 remain closed under the same influences as previously, and the solenoid current I236 remains at its high level until the end of the time period T7.

The effect of the switch S1 in closing at the beginning of time period T7 is to reduce the voltages on the lines 220 and 226 by shunting the resistor R4 across the resistors R2 and R3. The voltages on the lines 220 and 226 constitute the biasing voltages on the comparators CMP1 and CMP2 so that these comparators switch at the lower voltages V2' and V1' in lieu of the voltages V2 and V1 respectively at which corresponding switching of the comparators took place at the beginning and end of the time period T4.

On the reduction of the Regulator Control Voltage V218 to the value V2' (at the beginning of time period T8) the switches S3, S5 and S6 open, and the switch S4 closes. The comparator CMP1 switches at this time so that it provides a high output on its output line 214. The AND circuit 322 therefore is satisfied at this time so that the switch S4 is closed. The switch S4 therefore ceases to have a charging effect with respect to the capacitor C1. The increased signal on line 214 also is effective on the AND circuit 332 so as to satisfy the AND circuit 332 and reduce the Short R Feedback signal on line 334. The AND circuit 338 therefore is not satisfied, and the switch S3 is thus opened and the quick discharging action on the capacitor C1 ceases. The reduced signal on line 334 also has the action of causing the AND circuit 336 to be unsatisfied, and this has the effect of opening the switch S6 so that the resistor R7 is in effect in series with the solenoid winding 130a. The current through the solenoid winding 130a then flows through the resistor R7 producing an IR drop across this resistor. At the beginning of time period T8, this IR drop is greater than the voltage V2'; and the comparator CMP3 therefore has a low output. AND circuit 330 therefore is not satisfied and produces a high output which is applied to the switch S5 so that the switch S5 is opened. The current therefore quickly drops in the solenoid winding 130a to the "Unload Ramp" indicated in FIG. 3a existing at the beginning of time period T9.

The current flow through the solenoid winding 130a decreases gradually along the "Unload Ramp" indicated in FIG. 3a during the time period T9 due to the oscillating condition of the switch S5. The switch S5 is caused to oscillate in condition due to the action of the comparator CMP3 in the same manner that the switch S5 oscillates in order to cause the solenoid current to follow the "Load Ramp" indicated in FIG. 3a corresponding to the voltage ramp between the voltage levels V1 and V2. This gradually reducing current in the solenoid 130a causes the head 150F to be drawn gradually out of engagement with the disk 20F.

The Regulator Control Voltage on line 218 decreases to its value V1' at the end of the time period T9, and at this time the switches S4 and S5 open and the switch S3 closes. With the Regulator Control Voltage on the line 218 being V1', the comparator CMP2 switches, producing a low output on its output line 216. The AND circuit 322 therefore is not satisfied, and the switch S4 opens. This is the condition of the switch S4 initially providing a fast charge of the capacitor C1; however, it is not effective since the switch S3 for a quick discharge is likewise now effective for its intended function. The low signal level on line 216 produces a low Allow Driver signal on line 328 by means of inverter 324 and AND circuit 326, and this has the effect of causing the AND circuit 332 to be unsatisfied so as to produce a raised Short R Feedback signal on line 334. The AND circuit 338 is thus satisfied so as to close switch S3.

The signal levels on the lines 328 and 334 are respectively low and high at the end of time period T9, and the AND circuit 336 therefore is not satisfied. The switch S6 therefore remains open at this time. The signal level on line 328, however, is low so that the AND circuit 330 is not satisfied. The output of the AND circuit 330 therefore is high, and this has the effect of opening the switch S5. The closure of the switch S3 causes the voltage on the capacitor C1 to decrease to zero as shown in FIG. 3a, and the opening of the switch S5 in series with the solenoid winding 130a has the effect of reducing the current flow in the winding 130a to zero also as shown in this figure.

It is apparent from the above description that the main purpose of the resistor R7 is to function as a device for measuring the current flow through the solenoid winding 130a. When the solenoid winding is carrying an increasing current, the IR drop across resistor R7 increases and vice versa; and the IR drop is used for causing the comparator CMP3 to rapidly open and close the switch S5 that regulates the current flow through the solenoid winding 130a. The switch S6 in parallel with the resistor R7 is open, in general, when it is desired that the resistor R7 shall be so useful in regulating the current flow through the solenoid winding 130a.

The general purposes of the signals shown on the lower part of FIG. 3b are believed apparent from the above description; however, in recapitulation, it may be stated that, in brief, the purposes of these signals are as follows:

The Allow Driver voltage (V328) is the general control for the switch S5 and when high allows the switch S5 to close to provide current through the solenoid winding 130a. The Short R Feedback voltage (V334) is a general control of the switch S6 and when high, in conjunction with the Allow Driver voltage being high, permits resistor R7 to be shorted. The Fast Up voltage (V312) on line 312, when high, allows the fast charge of capacitor C1. The Fast Down voltage (V306) on line 306, when low, causes the fast discharge of capacitor C1.

The force exerted by the solenoid 130F, as described, moves the bail 134F which in turn moves the magnetic head 150F and pressure plate 146F. The slowly rising "Load Ramp" of solenoid current, I236, in solenoid winding 130a, corresponding to the rise from V1 to V2 of the charge on the capacitor C1, is to cause a very slow engagement of the magnetic head 150F on the disk 20F during the critical part of the head engaging action for substantially reducing the wear of the head and disk. The gradually decreasing "Unload Ramp" of solenoid current, I236, is used so as to cause the head 150F to be gradually disengaged from the disk 20F so that the magnetic head 150F does not oscillate and rebound back onto the disk 20F during disengagement causing undue disk and head wear. Such oscillation could possibly occur if the head suspension system of U.S. Pat. No. 4,089,029, previously referred to, and particularly the gimbal springs 176 and 184 of this patent, for head mounting are used. Such a gradual deapplication of the head 150F with respect to the disk 20F also assures that such gimbal springs are not so roughly treated as to break.

The voltages V2' and V1' are respectively lower than the voltages V1 and V2, and likewise the "Unload Ramp" of solenoid current is lower than the "Load Ramp" of solenoid current (see FIG. 3a) due to the electromagnetic hysteresis of the solenoid 130F. The solenoid 130F has a so-called "keeper" effect in which the armature 130b tends to remain in a solenoid energized position, and the current for pulling the armature 130b in a direction to engage the head 150F with the disk 20F is greater than the solenoid current allowing movement of the armature 130b in the opposite direction. Advantageously, the head load controller shown in FIGS. 1 and 2 provides a random delay (0 to 10 milliseconds, uniformly distributed, if the oscillator period T is 10 milliseconds, for example) to be introduced to spread the impact points of the head 150F on the disk 20F randomly over a certain sector, which may be 22°, assuming that the period of revolution of disk 20F is 167 milliseconds, for example. It is assumed that the head engaging operation is initiated at a certain rotative position of the disk, such as by an index pulse derived from the disk. This reduces the oxide erosion of the magnetic coating on the disk 20F, since the head 150F rarely contacts the disk at the same place consecutively.

As will be apparent particularly from FIG. 3a, the capacitor C1 is charged at three different rates, so that the voltage on the capacitor increases abruptly during time period T3, increases gradually during time period T4 and then again increases abruptly during time period T5. These voltage variations may be considered proportional with time, since they are controlled by increasing the charge on capacitor C1 in a controlled manner. The current in solenoid winding 130a and in line 236 is caused to increase in much the same manner and with the same steps. This proportional application of current to the winding 130a thus during time period T3 takes the slack out of the head engaging system, and starts to move the head 150F into close proximity with disk 20F, gradually making contact of the head 150F on the disk 20F during time period T4 and then moving bail 134F completely out of engagement with the hook 148F during the subsequent time period T5 so that the head 150F follows the disk 20F with no influence from bail 134F. Thus, the head 150F has been moved at a controlled velocity toward disk 20F, and only when the force on the head has been increased to a point where a head-disk contact is assured is the solenoid 130F turned on in full force. Thus, the wear of the head 150F on the disk 20F due to the engagement of the head 150F on the disk is reduced to a minimum.

Having thus described the invention, what is claimed as new, and desired to secure by Letters Patent is:

1. Information transferring apparatus for use with a moving information carrying medium comprising:
   a transducer movable from an inoperative position separated from the medium and toward the medium and to an operative data transferring position on a single selected track on the medium,
   motor means connected with said transducer for so moving the transducer from its said inoperative position to its operative position when the motor means is operable,
   control mechanism connected with said motor means for rendering the motor means so operable to cause it to move said transducer from its said inoperative position to its said operative position on the reception of a transducer load command signal applied to the control mechanism, and
   means for randomly delaying this energization of said motor means to move said transducer from its said inoperative position to its operative position at a random time after said transducer load command signal is applied to said control mechanism.

2. Information transferring apparatus as set forth in claim 1, said moving information carrying medium constituting a rotatable magnetic disk and the information transferring apparatus including means responsive to a certain rotative position of said disk for producing said transducer load command signal at this particular disk position.

3. Information transferring apparatus as set forth in claim 1, said means for randomly delaying the energization of said motor means including a free running oscillator having time spaced output pulses and including also a control circuit having said transducer load command signal and said oscillator output pulses as inputs and of such a type that it provides an output signal to energize said motor means on the existence of both said transducer load command signal and a said oscillator output pulse.

4. Information transferring apparatus as set forth in claim 3, said motor means constituting an electric solenoid which is energized electrically for rendering the motor means operable to cause it to move said transducer from its said inoperative position to its said operative position and said control mechanism constituting a voltage source and switches under the control of said control circuit for connecting the voltage source with said solenoid so as to energize said solenoid.

5. Information transferring apparatus for use with a moving information carrying medium comprising:
   a transducer movable from an inoperative position separated from the medium and toward the medium and thus to an operative data transferring position on a single selected track on the medium,
   motor means connected with said transducer for so moving the transducer from its said inoperative position to its said operative position when the motor means is energized,
   control means connected with said motor means for so energizing the motor means at a relative rapid rate so as to cause said transducer to have a first relatively fast phase of movement toward the magnetic medium, and
   second control means connected with said motor means for subsequently energizing said motor means at a relatively slow rate to thereby cause said transducer to have a subsequent relatively slow phase of engagement with said medium.

6. Information transferring apparatus as set forth in claim 5 and including third control means effective to energize said motor means at a relatively fast rate subsequent to said relatively slow rate.

7. Information transferring apparatus as set forth in claim 5, said motor means constituting an electric solenoid and the information transferring apparatus including a source of voltage connectable with said solenoid, said first named control means including means for so connecting said voltage source with said solenoid so that the current in said solenoid rises at a rapid rate, said second control means including means for connecting said voltage source and said solenoid and electrical means for attenuating and thereby controlling the flow of current in said solenoid so that it increases at a relatively slow rate.

8. Information transferring apparatus as set forth in claim 7 and including third control means which includes means for so connecting said voltage source with said solenoid so that the voltage source causes the current to increase rapidly in said solenoid subsequently to the relatively slow rate of increase of current through said solenoid.

9. Information transferring apparatus as set forth in claim 5 and including third control means effective to energize said motor means at a relatively fast rate subsequent to said relatively slow rate, said motor means including:
   a spring effective to move said transducer from its said inoperative position toward its said operative data transferring position,
   a lever supporting said transducer against the action of said spring, and
   an electric solenoid moving said lever in a direction to allow said spring to move said transducer from its said inoperative position to its said operative data transferring position when the electric solenoid is energized.

10. Information transferring apparatus for use with a moving information carrying medium comprising:
    a transducer movable from an inoperative position separated from the medium and toward the medium and thus to an operative data transferring position on a single selected track on the medium,
    an electric solenoid connected with said transducer for so moving the transducer from its inoperative position to its operative position when the solenoid is energized,
    a source of electrical voltage,
    a capacitor,
    means for connecting said capacitor with said voltage source so that the voltage builds up on the capacitor, and
    means for regulating the current flow through said solenoid so that it increases in substantially the same manner as the voltage on said capacitor increases to that the solenoid provides a correspondingly increasing force on said transducer urging it onto the medium.

11. Information transferring apparatus as set forth in claim 10, said regulating means including:
- a comparator connected with said capacitor so as to have the capacitor voltage impressed on it,
- a resistor connected in series with said solenoid so as to have a voltage drop across it proportional to the current through said solenoid and connected also with said comparator so as to impress the voltage across the resistor also on the comparator, and
- a switch in series with said solenoid and controlled by the output of said comparator so that the switch is alternately opened and closed whereby the current flow through the solenoid increases substantially in the same manner as the increase in voltage on said capacitor.

12. Information transferring apparatus as set forth in claim 10 and including electrical resistor means in series with said capacitor for controlling the charging of the capacitor when said regulating means is operative,
- switching means for switching said resistor means effectively in and out of the circuit with said capacitor, and
- voltage responsive means responsive to the voltage on said capacitor for causing said switching means to be inoperative to effectively connect said resistor means in series with said capacitor below a predetermined voltage on said capacitor and to cause said switching means to effectively connect said resistor means in series with the capacitor above this voltage on the capacitor.

13. Information transferring apparatus as set forth in claim 12 and including another voltage responsive means responsive to the voltage on said capacitor and effective on said switching means to cause said switching means to disconnect said resistor means from series relationship with respect to said capacitor when the voltage on said capacitor has increased to a higher level than the predetermined voltage at which said first named voltage responsive means is effective.

14. In a method for moving a transducer from an inoperative position separated from a moving information carrying medium and toward the medium and thus to an operative data transferring position on a single selected track on the medium, the steps of:
- deriving a signal from the moving information carrying medium synchronized with the medium so that the signal occurs when the medium passes a predetermined point in its movement,
- delineating a random delay time subsequent to the occurrence of said signal, and
- initiating and completing the movement of said transducer toward said medium and to an operative data transferring position on a single selected track on the medium at the expiration of said random delay time.

15. A method as set forth in claim 14, said information carrying medium constituting a rotatable magnetic disk and said transducer constituting a magnetic head, said signal being derived from said disk at a certain degree of rotation of the disk and said delay time being less than the time of a single revolution of the disk.

16. In a method for moving a transducer from an inoperative position separated from a rotating magnetic disk and toward the disk and thus to an operative data transferring position on a single selected track on the disk, the steps of:
- deriving a signal that has a continuous value from its inception and synchronized with the disk so that the signal starts when the disk passes a predetermined point in its movement, providing a second signal that occurs after a random delay time subsequent to the inception of said first named signal by determining the simultaneous existence of said first named signal and a pulse from a free running oscillator occurring while said first named signal has its said continuous value, and
- initiating the movement of said transducer from its inoperative position separated from the disk and toward the disk and thus to an operative data transferring position on a single selected track on the disk under the control of and on the inception of said second signal.

* * * * *